United States Patent
Malev et al.

(10) Patent No.: US 10,645,458 B2
(45) Date of Patent: May 5, 2020

(54) ENLARGEMENT OF SCREEN-CAPTURE RECORDED INTO A VIDEO RECORDING DURING PLAYBACK THEREOF

(71) Applicant: NICE LTD, Ra'anana (IL)

(72) Inventors: Alexander Malev, Givat Koach (IL); Lior Moshe, Ramat Gan (IL); Dror Eyal, Tel Aviv (IL)

(73) Assignee: NICE LTD, Ran'anana (IL)

(*) Notice: Subject to any disclaimer, the term of this patent is extended or adjusted under 35 U.S.C. 154(b) by 49 days.

(21) Appl. No.: 16/102,800

(22) Filed: Aug. 14, 2018

(65) Prior Publication Data
US 2020/0059699 A1 Feb. 20, 2020

(51) Int. Cl.
*H04N 21/485* (2011.01)
*G06F 16/958* (2019.01)
*G06F 16/957* (2019.01)

(52) U.S. Cl.
CPC ..... *H04N 21/4858* (2013.01); *G06F 16/9577* (2019.01); *G06F 16/986* (2019.01)

(58) Field of Classification Search
CPC .............. H04N 21/4858; G06F 16/986; G06F 16/9577
See application file for complete search history.

(56) References Cited

U.S. PATENT DOCUMENTS

| 6,643,666 B1* | 11/2003 | Kernz | G06Q 40/04 |
| 2014/0253574 A1* | 9/2014 | Brown | G06T 1/0007 345/545 |

* cited by examiner

*Primary Examiner* — Ahmed A Berhan
(74) *Attorney, Agent, or Firm* — Soroker Agmon Nordman

(57) ABSTRACT

A method for enlarging a screen-capture concatenated into a matrix of multiple different screen-captures during playback of a video recording in a video player application, executed by a processor of a computerized system, may include receiving a video recording of a plurality of screen-captures. The video recording may include metadata with coordinates defining a position or a size of each screen-capture from the plurality of screen-captures in the video recording. A selection may be received from a user using an input device coupled to the computerized system of a screen-capture from the plurality of screen-captures in the video recording to view on a display. The coordinates of the selected screen-capture may be transformed by applying an algorithm based on HTML elements, so as to enlarge the selected screen-capture within a mask container. The enlarged screen-capture in the mask container selected by the user may be displayed on the display.

30 Claims, 10 Drawing Sheets

ENLARGEMENT OF SCREEN-CAPTURE
RECORDED INTO A VIDEO RECORDING
DURING PLAYBACK THEREOF

FIELD OF THE INVENTION

The present invention relates to video players, and more particularly to the enlargement of video elements in a video recording during playback.

BACKGROUND OF THE INVENTION

A company may use customer call centers to provide customer service for their products and/or services. The customer experience in interacting with agents at the customer service center may depend, for example, on the efficiency of the agent to solve the customer's problem in a single interaction between the agent and the customer.

To track an agent's efficiency in handling the customer's call and solving the customer's problem, the company may monitor and/or record customer calls of the agents in the company for quality control. The desktop or workstation of each agent may include multiple monitors, displays, or screens. The multiple monitors may be used to provide different information to the agent simultaneously in real time, such as for example, information regarding the customer, the product and/or services in question, and/or any other information needed by the agent to solve the customer's problem regarding the company's product and/or services.

Quality control personnel and/or the agent's managers, for example, may monitor the agent's customer calls for assessing agent performance and/or agent efficiency using different screen recording solutions. Typically, the information presented and/or accessed by the agent on the multiple screens and/or monitors used by the agent during each customer call may be recorded into a single video recording along with the conversation between the customer and the customer service agent. The different images displayed on each of the agent's multiple monitors during the customer call may be dumped into and/or concatenated in the video recording as a matrix of different images, for example, each image smaller in size in the video recording than the original images viewed by the agent during the customer call.

Thus, there may be a need for a video recording application that allows efficient high quality enlargement of each image of the multiple monitors captured in a video recording during playback of the video recording.

SUMMARY OF THE INVENTION

There is thus provided, in accordance with some embodiments of the present invention, a method for enlarging a screen-capture concatenated into a matrix of multiple different screen-captures during playback thereof in a video player application. The video player application may be executed by a processor of a computerized system, which may include the processor and a display. A video recording of a plurality of screen-capture concatenated into a matrix of multiple different screen-captures including metadata with coordinates defining a position or a size of each screen-capture from the plurality of screen-captures concatenated into a matrix of multiple different screen-captures in the video recording may be received. A selection may be received from a user using an input device coupled to the computerized system of a screen-capture from the plurality of screen-captures concatenated into a matrix of multiple different screen-captures in the video recording to view on the display. The coordinates of the selected screen-capture may be transformed by applying an algorithm based on HTML elements so as to enlarge the selected screen-capture within a mask container. The enlarged screen-capture in the mask container selected by the user may be displayed on the display.

Furthermore, in accordance with some embodiments of the present invention, the metadata for each screen-capture from the plurality of screen-captures may include a resolution of each screen-capture in the video recording.

Furthermore, in accordance with some embodiments of the present invention, the method may include displaying for the user on the display a plurality of screen-capture icons corresponding to the plurality of screen-capture in the video recording.

Furthermore, in accordance with some embodiments of the present invention, receiving the selection of the screen-capture may include clicking by the user using the input device on one screen-capture icon from the plurality of screen-capture icons on the display.

Furthermore, in accordance with some embodiments of the present invention, displaying the plurality of screen-capture icons may include dynamically changing a number of screen-capture icons on the display from a first number to a second number, in response to detecting that a number of screen-captures in the video recording changes from the first number to the second number.

Furthermore, in accordance with some embodiments of the present invention, the video player application executed by the processor may include components selected from the group consisting of: a data model, an HTML markup, a CSS style sheet, and a Javascript code.

Furthermore, in accordance with some embodiments of the present invention, transforming the coordinates of the selected video element may include adjusting an aspect ratio of the mask container to an aspect ratio of the display.

Furthermore, in accordance with some embodiments of the present invention, receiving the video recording may include receiving the metadata acquired in response to querying an operating system of the computerized system about the position or the size of each screen-capture during recording of the video recording.

Furthermore, in accordance with some embodiments of the present invention, the video player application may include an HTML video player for playback of the video recording.

There is further provided, in accordance with some embodiments of the present invention, a computerized system executing a video player application for enlarging a screen-capture concatenated into a matrix of multiple different screen-captures during playback of a video recording. The computerized system may include a display and a processor. The processor may be configured to receive a video recording of a plurality of screen-captures including metadata with coordinates defining a position or a size of each screen-capture from the plurality of screen-captures in the video recording, to receive a selection from a user using an input device coupled to the computerized system of a screen-captures from the plurality of screen-captures in the video recording to view on the display, to transform the coordinates of the selected screen-capture by applying an algorithm based on HTML elements so as to enlarge the selected screen-capture within a mask container, and to display the enlarged screen-capture in the mask container selected by the user on the display.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

Figure 1:
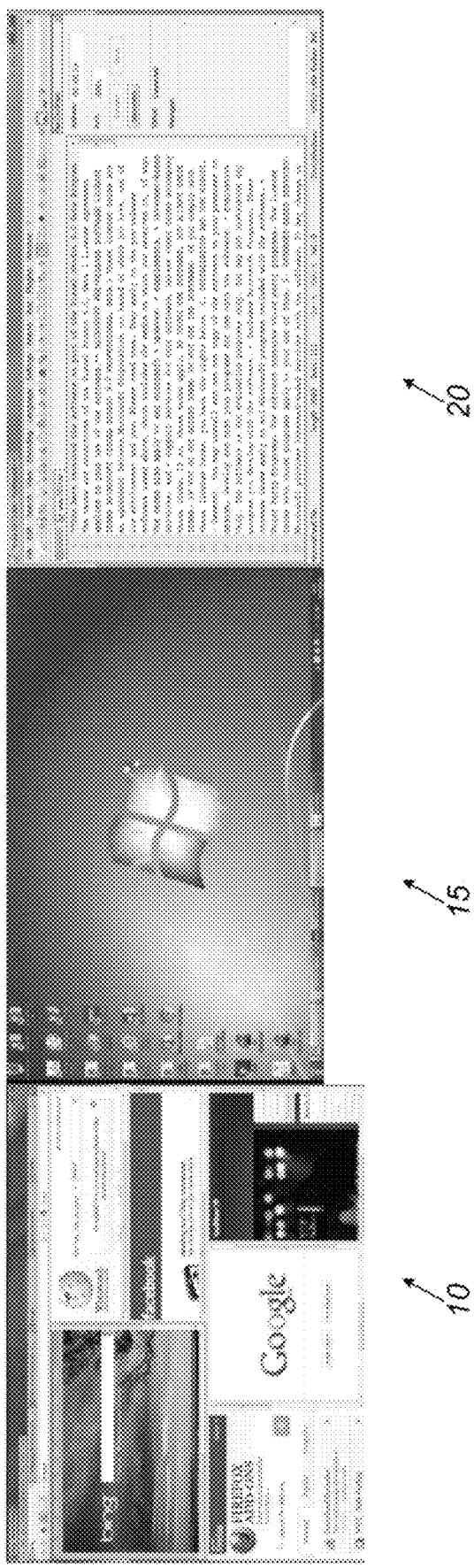
FIG. 1 schematically illustrates a video recording with three video elements, in accordance with some embodiments of the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

When the images from multiple monitors used by a customer service agent in a call center are recorded into a video recording, the video recording, typically a video recording application running in a web application, may be played back on a single screen by a user. The user may be but not limited to the manager of the customer service agent, or quality control personnel, for example. Whereas the customer service agent originally viewed the information previously on larger multiple screens, the user now views the video recording of a particular customer call with a matrix of multiple different screens in a single full screen, where each of the multiple different screens may be typically much smaller than the original screens viewed by the agent. Thus, the video recording is not useful to the user without the capability of enlarging each screen in the matrix of multiple screen in the video recording, so as to be able to see each image of a desired monitor on the display of the user.

As an example merely for conceptual clarity, and not by way of limitation of embodiments of the present invention described herein, suppose that the customer service agent may have used four 27-inch monitor displays during a customer call, each monitor with different video content. During a 20 minute customer call, for example, each image of the four 27-inch screens are concatenated into a matrix and recorded into a video recording. The manager of the customer service agent may wish to review the customer call of the agent by viewing the video recording. The video recording may played back on the manager's single 27-inch screen, for example.

In this example for conceptual clarity, suppose that the video recording of the four screens were recorded in a manner that during playback, each image of the four original screens are played back on four respective quadrants of the manager's single 27-inch screen. Thus, the manager may view the four original agent's screens in each quadrant of the manager's display with or less of the area of the original screen viewed by the customer service agent. Accordingly, the user, such as the manager, may need to zoom into and enlarge the content of the desired screen in a particular quadrant chosen from the four screen, so as to view the enlarged content of the desired screen on the user's 27 inch monitor. However, when the user tries to enlarge the view one of the multiple screens within the video recording playback using a typical video player, the content of each screen in the matrix of multiple different screens in the video recording when enlarged may be unclear or distorted.

Moreover, if the user zooms in and scrolls manually to the desired region during playback of the video recording, such that the desired region fills up the area of the user's screen display, the video may overflow the area of the user's screen display. The user may need to manually scroll the zoomed in of the video recording back into position, which is a bad user experience.

Another solution to improve user experience, the video player may repaint the desired enlarged region of the video recording onto a canvas element frame by frame. The canvas is an element that is treated by a browser as an image. This effect may be programmed in code and executed by the computer in real time during video playback. However, this solution treats the video as a series of images. The computer processor is configured to capture the video frame by frame, and to repaint the desired region of the video frame onto the canvas element.

Although this solution may be used for lower resolution videos or effects, it is unusable for displaying videos in ultra-high resolution in the video recording with screen captures of the agent's multiple monitors during the customer call. This solution may capture the video with a series of high-resolution images and repaint each captured image of a few MB of size at 30 frames per second for smooth playback. For videos with high resolution, such as in the video recordings made during the customer call as described herein, where the screen recordings may be larger than 3000 pixels, playback may severely lag as this playback solution severely loads down the processor and reduces the computational efficiency of the computer itself. Hence, the embodiments presented herein below improve the computational efficiency of the computer itself since there is no need to re-render the video due to enlarging the monitor for view by the user during playback.

Embodiments of the present invention herein describe a video player application operating in a web browser environment for enlarging video elements that are selected by a user during the playback of a video recording. The video player application may be implemented in computer code and executed by the processor of a computerized system or device. The term video element as used herein refers an image captured in the video recording of a monitor, screen, or display of the customer service agent as recorded during the customer call. The video recording may include multiple video elements since the video recording typically captures multiple images of respective multiple monitors, screens, or displays used by the customer service agent during the customer call.

In some embodiments of the present invention, the video player application may receive the video recording of the customer call including metadata with coordinates defining a position, a size, and/or a resolution of each video element from the multiple video elements in the video recording (e.g., from the agent's multiple screens at the agent's workstation during the customer call). The metadata may be acquired in response to querying the operating system running on the agent's workstation as to the information of the monitors connected thereon during the video recording of the conference call between the agent and the customer. This metadata information may then be passed with the video recording either concurrently or separately to the video player application for playback.

During playback of the video recording, the user may view the video playback with a plurality of video elements. The video player application may create a menu of video element icons corresponding to the number of video elements in the video recording, which may be displayed to the user. The user may select a video element from the plurality of video elements to view enlarged or zoomed-in on the user's display by clicking, for example, on the corresponding video element icon.

The video player application may be an HTML web-application video player. The video player application may be configured to utilize a unique combination of styles applied to a combination of HTML elements, and an algorithm executed by the processor to manipulate the size and location of the video element itself behind a mask container based on the coordinates of each video element in the received metadata. The coordinates of the video element selected by the user in the video recording may be transformed and the aspect ratio of the selected video element scaled so as zoom into the selected video element on the user's screen.

In this manner, there is no need to re-render the video on playback. Instead the data stored in the high-resolution video element itself is used, which results in a highly efficient playback of the zoomed video element with little computational overhead by the browser and the processor. Stated differently, the user may receive an excellent user experience by allowing the user to choose the video element and to receive a high-resolution zoom and cropping of the selected video element in a click of a button.

In some embodiments of the present invention, the user may seamlessly toggle between zoom views of the different video elements as if they were separate video feeds. Moreover, if during the customer call, another screen was switched on, or one of the screens were switched off by the agent as captured in the video recording, the video player application may dynamically adjust the number of video element icons in real time to reflect the change in the number of video elements during playback of the video recording.

FIG. 1 schematically illustrates a video recording 5 with three video elements, in accordance with some embodiments of the present invention. Each of the three video elements corresponds to a monitor originally viewed at the desktop station of the customer service agent during a customer call. A first video element 10 may include webpages, a second video element 15 may include a Windows desktop, and a third video element 20 may include a text document, for example, arranged in a 3×1 matrix. The example shown in FIG. 1 is merely for visual clarity and not by way of limitation of embodiments of the present invention. Video recording 5 may include any number of video elements (e.g., monitor images) arranged in any aspect ratio (e.g., matrix) with any suitable video content.

Figure 2:
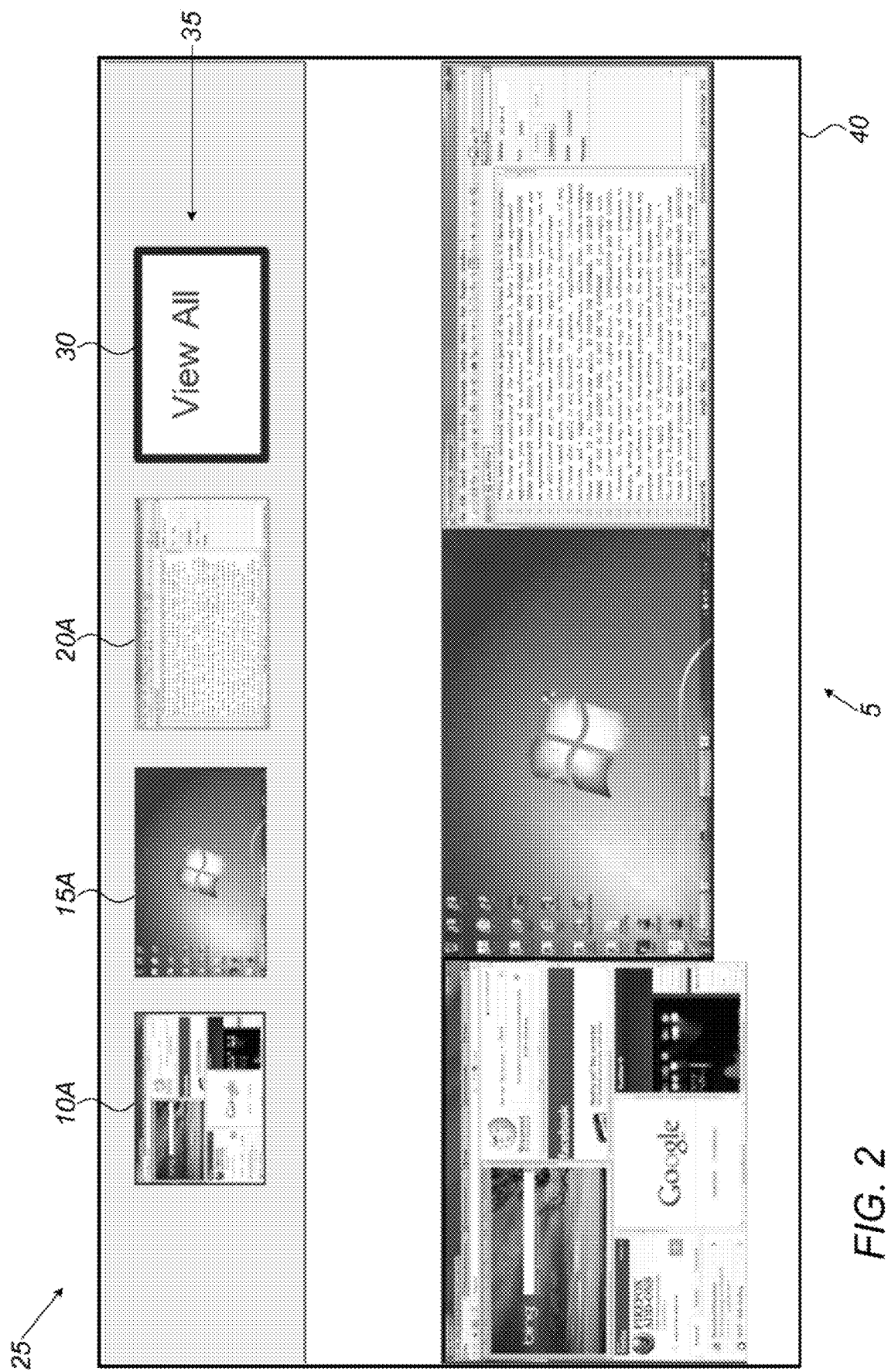
FIG. 2 schematically illustrates a first view of a graphic user interface (GUI) of a video player application on a display, in accordance with some embodiments of the present invention.

FIG. 2 schematically illustrates a first view of a graphic user interface (GUI) 25 of a video player application on a display, in accordance with some embodiments of the present invention. GUI 25 may include a window 40 for playing back video recording 5. GUI may include a menu 35 with a first video element icon 10A corresponding to first video element 10, a second video element icon 15A corresponding to second video element 15, a third video element icon 20A corresponding to third video element 20, and a "VIEW ALL" icon 30. A user may choose which video element to view by clicking on one of the icons.

Figure 3:
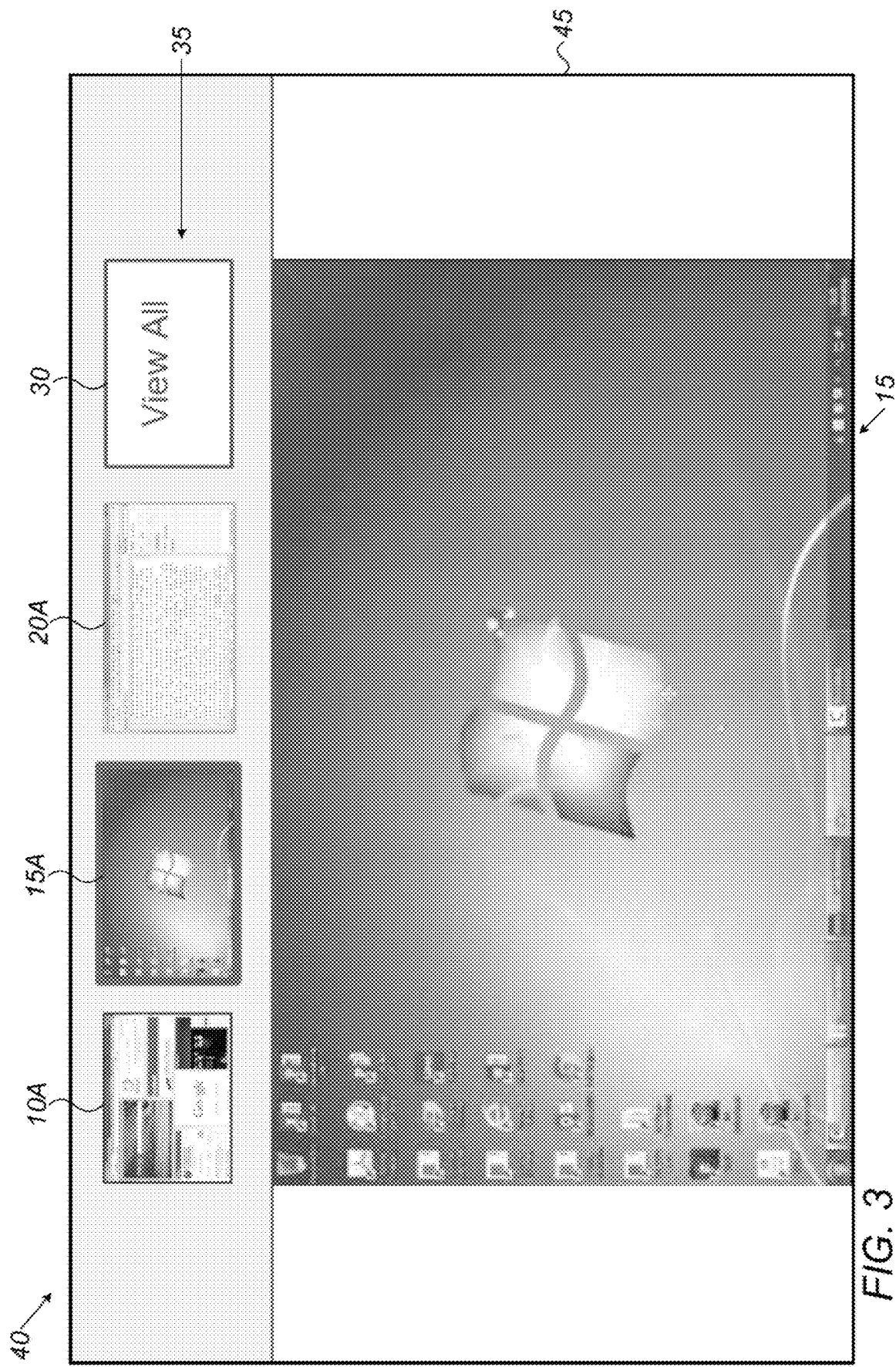
FIG. 3 schematically illustrates a second view of a graphic user interface (GUI) of a video player application on a display, in accordance with some embodiments of the present invention.

FIG. 3 schematically illustrates a second view of graphic user interface (GUI) 25 of a video player application on a display, in accordance with some embodiments of the present invention. Suppose for example, the user may wish to zoom in on video element 15 in video recording 5, the user may click on icon 15A so as to view an enlarged view 45 of video element 15 as shown in FIG. 3. If the user wishes to return to view full video recording 5 with the three video elements, the user may click on "VIEW ALL" icon 30 to return to the view shown in FIG. 2.

Figure 4:
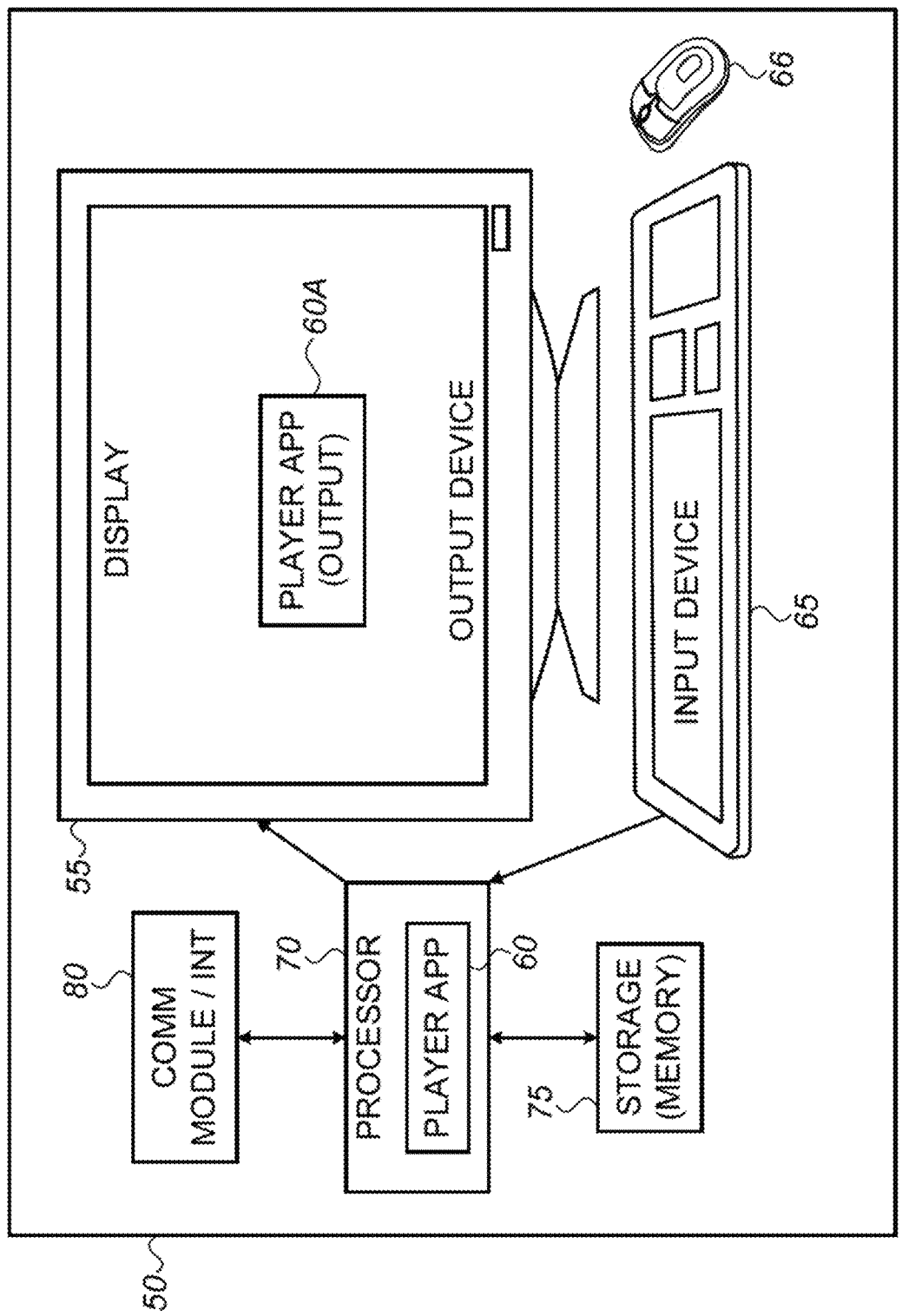
FIG. 4 is a block diagram of a computerized system executing a video player application, in accordance with some embodiments of the present invention.

FIG. 4 is a block diagram of a computerized system 50 executing a video player application 60, in accordance with some embodiments of the present invention. Computerized system 50 may be implemented as for example, a desktop or laptop computer used by the user for playing back video recording 5 on video player (playback) application 60. Computerized system 50 may include a processor 70, a memory 75, and a communication module and interface 80 (e.g., circuitry) for enabling communication between computerized system 50 and other computing devices via any suitable wired and/or wireless communication protocols.

Processor 70 may include one or more processing units, e.g. of one or more computers. Processor 70 may be configured to operate in accordance with programmed instructions stored in memory 75. Memory 75 may be used to store the code of video player application 60 executed by processor 70, as well as video recording 5 and associated metadata, for example. In operation, processor 70 may execute a method for enlarging a video element during playback of video recording 5 in video player application 60.

Processor 70 may communicate with memory 75. Memory 75 may include one or more volatile or nonvolatile memory devices. Memory 75 may be utilized to store, for example, programmed instructions for operation of processor 70, data or parameters for use by processor 70 during operation, or results of operation of processor 70.

Processor 70 may communicate with an output device 55. For example, output device 55 may include a computer display, monitor, or screen. Processor 70 may communicate with a screen of output device 55 to display an output 60A of video player application 60 (e.g., such as GUI 25). In another example, output device 55 may include a printer, display panel, speaker, or another device capable of producing visible, audible, or tactile output.

Processor 70 may communicate with an input device 65. For example, input device 65 may include one or more of a keyboard, keypad, or a pointing device 66 for enabling a user to inputting data or instructions for operation of processor 70 such as for selecting one of the video element icons in menu 35, for example.

Figure 5:
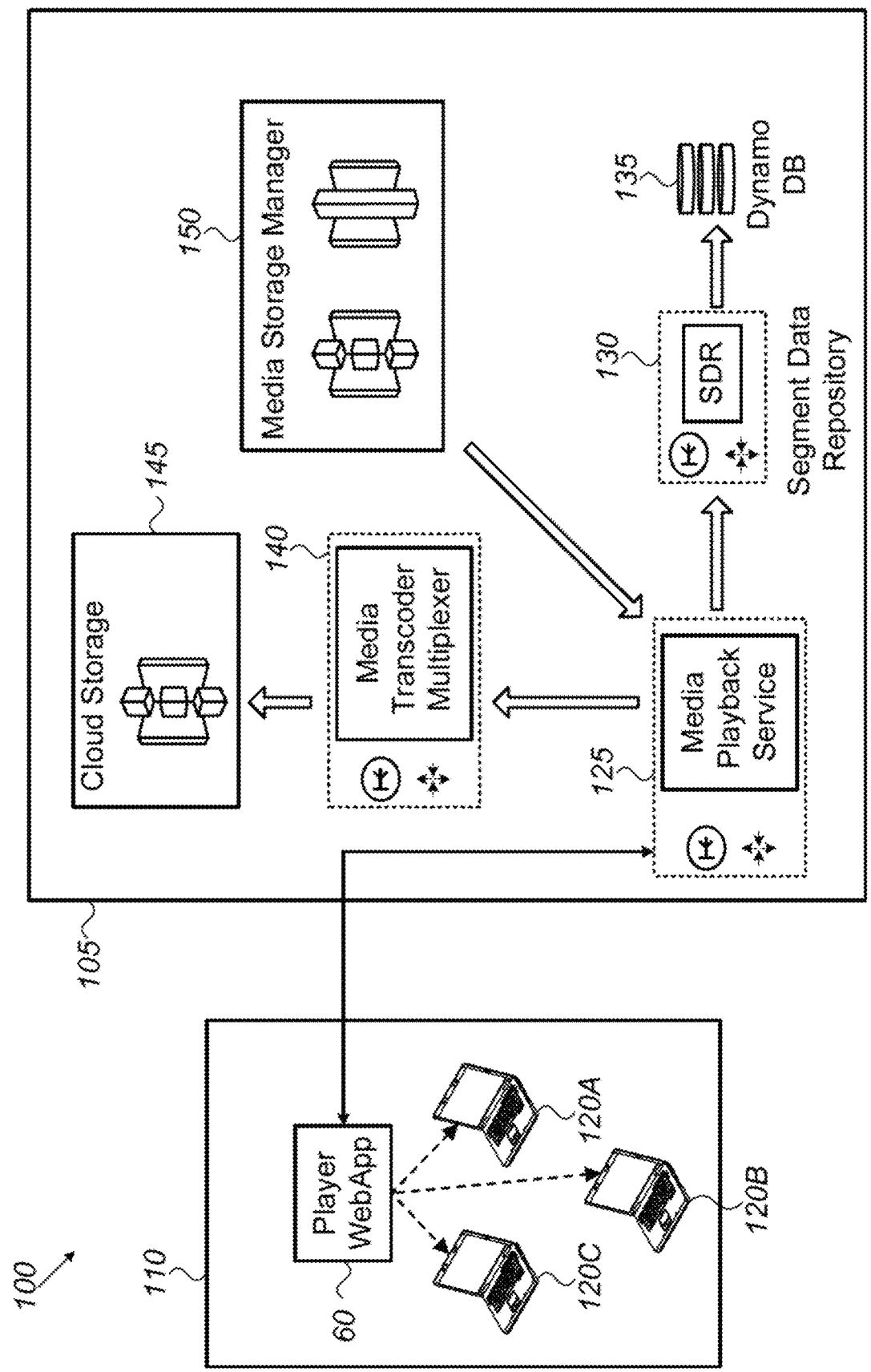
FIG. 5 schematically illustrates a workforce management (WFM) system architecture and flow diagram for use of a video player application, in accordance with some embodiments of the present invention.

FIG. 5 schematically illustrates a workforce management (WFM) system architecture and flow diagram 100 for use of video player application 60, in accordance with some embodiments of the present invention. WFM system architecture 100 may include a cloud computing service backend 105 and a WFM frontend 110 for video player web application 60 running on multiple platforms 120 of different users 120 denoted 120A, 120B. 120C, etc. The different users may monitor multiple agents across multiple call center sites that may be geographically diverse. Cloud computing service backend 105 may include Amazon Web services, for example.

In some embodiments of the present invention, video player application 60, such as NICE CXone Player, for example, may be a web-based application. Video player application 60 may be compatible with all major browsers such as Google Chrome, Firefox, or Internet Explorer, for example. Video player application 60 may allow the user to playback calls recorded in NICE CXone Pro Suite, for example, including the audio and the multiple screens acquired during the customer call. Video player application 60 in WFM frontend 110 may interface with playback services (e.g., a Media Playback Service 125) in Cloud computing service backend 105 via a representational state transfer—application programming interface (e.g., REST API).

Media Playback Service (MPS) 125 is a backend service, which may receive a playback request from video player application 60. MPS 125 may retrieve all call metadata from a Segment Data Repository 130 and a dynamo database 135. MPS 125 may connect to a Media Transcoder Multiplexer (MTM) service 140 for preparing the media file for playback, and for relaying the media file location with a playlist to video player application 60, so as to allow video player application 60 to playback the file.

Media Transcoding Manager (MTM) service 140 may be used to prepare the media for playback. MTM 140 may download the recording files from a Media Storage Manager 150, transcode and merge the recording into a standard MP4 file (supported by the player application), upload the final standard MP4 file to a temporary storage (e.g., a cloud storage 145), and send the media file location to MPS 125 for forwarding to video player application 60. In some embodiments, cloud storage 145 may include Amazon Web Services (AWS) cloud storage services such as an AWS S3 bucket.

In some embodiments of the present invention, video player application 60 for enlarging a video element during playback of a video recording may include a data model accompanying the video recording, an HTML markup, a CSS style sheet, and a JavaScript code.

Figure 6:
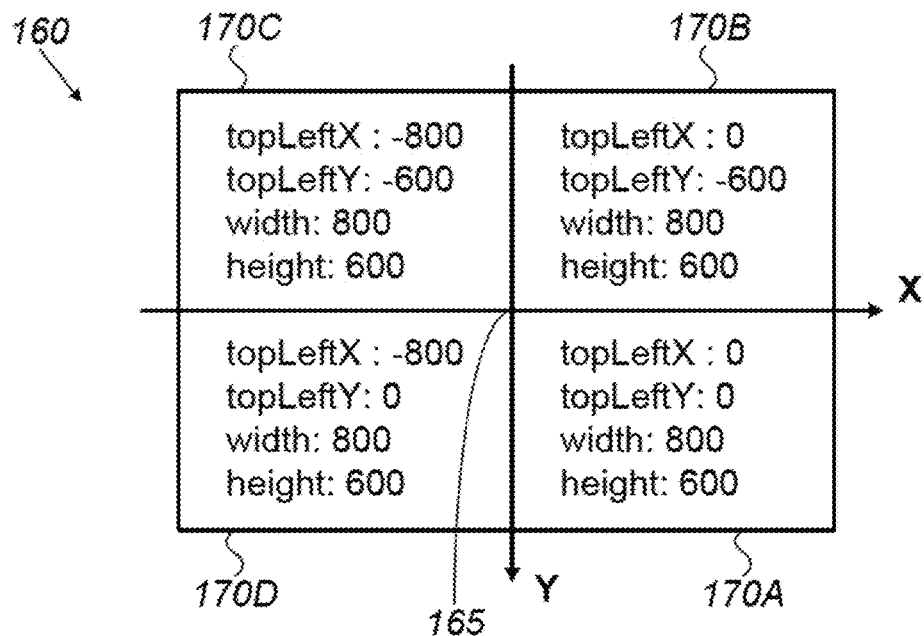
FIG. 6 is a data model represented as a graph showing four data objects, in accordance with some embodiments of the present invention.

FIG. 6 is a data model 160 represented as a graph showing four data objects 170, in accordance with some embodiments of the present invention. Data model 160 may provide information regarding the number of recorded monitors during the customer call, as well as their formation, positions and sizes within video recording 5. The example of data model 160 as shown in FIG. 6 may include a 2×2 array or matrix of objects denoted 170A, 170B, 170C, and 170D, each object 170 may represent one recorded screen in video recording 5. Each of the recorded monitors may have a resolution of 800×600 pixels.

Each object 170 may include four properties in the data model structure: topLeftX, topLeftY, width, and height, topLeftX and topLeftY may be used to respectively describe the x and y coordinates of the top left corner of each object in a graphical X-Y coordinate system with units of pixels. topLeftX and topLeftY may be positive or negative integers, width and height describe the width and height of the recorded monitor in pixels. According to the configuration of display 55 of the user, the main monitor in the played back video recording as shown in the bottom right quadrant of FIG. 6 may be located at an origin 165, e.g., (0,0) in the X-Y graphical coordinate system. The rest of the recorded monitors may be referenced in relation to the main monitor in the example shown in FIG. 6.

Figure 7:
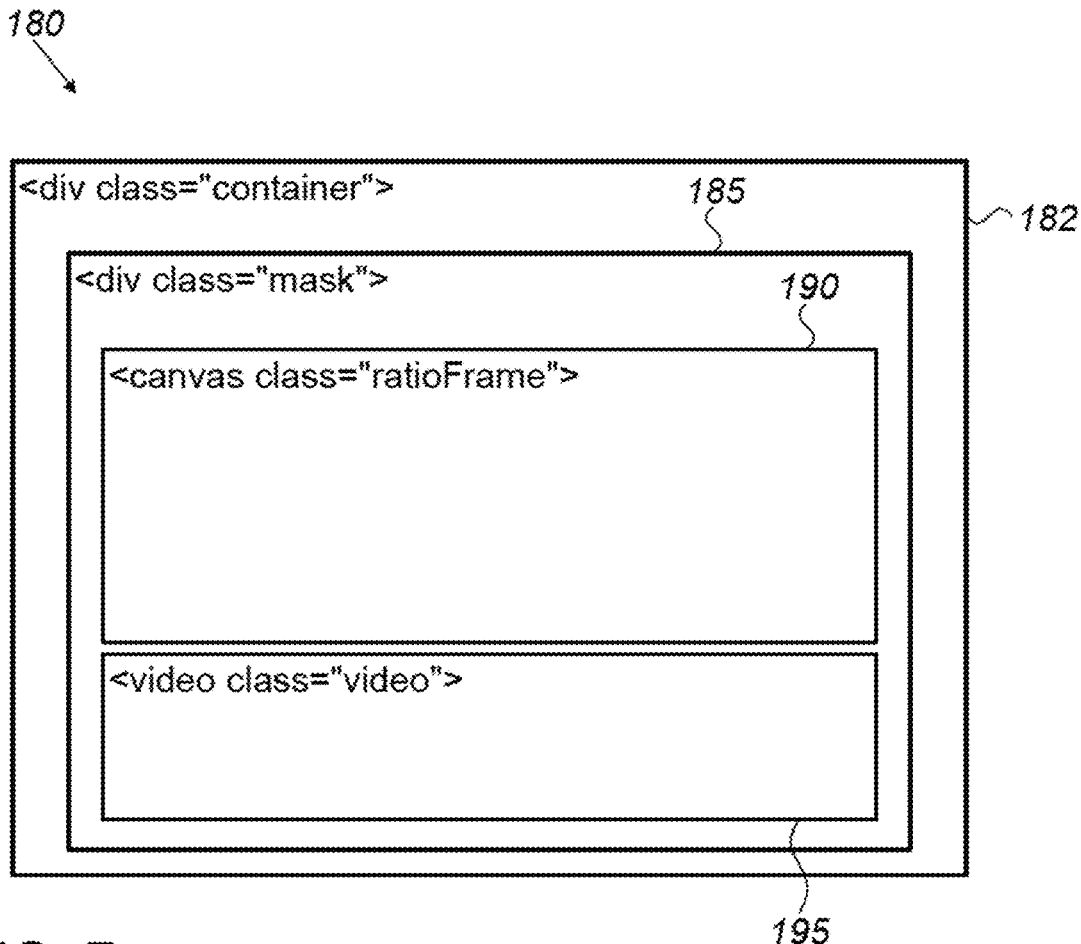
FIG. 7 schematically illustrates a Hyper Text Markup Language (HTML) structure, in accordance with some embodiments of the present invention.

FIG. 7 schematically illustrates an HTML structure 180, in accordance with some embodiments of the present invention. The HTML markup component of video player application 60 may include HTML structure 180 of four HTML elements (div classes): container div 182, mask div 185, canvas ratio frame 190 and video element 195.

Container div 182 is an HTML element that may be used to mark the area on display 55 in which the video may be displayed. Container div 182 may have any desired size such as, for example, absolute size of the browser window (e.g., 800×450 pixels), relative (e.g., 70% of the window height), or full screen. The displayed video may occupy the available display space in this container, bounded by the height and/or the width of the container.

Mask div 185 is an HTML element that may be used to mask the object, so as to show only the part of the video recording that fits therein, while the part of the video outside of mask div 185 may be hidden. Mask div 185 may also be referred to as a mask container, or a mask div container. Anything portion of video recording 5 inside of the mask container will be shown on display 55 in GUI 25 during playback whether the portion of video recording 5 may include a view of all video elements of video recording 5, or an enlarged view of the selected video element.

Canvas ratio frame 190 is an HTML element (e.g., ratio frame container) that may define the aspect ratio of the parent mask div. A canvas is an HTML element that may be handled by the browser as an image. The canvas may be used to draw an image using JavaScript code. However in the context of this disclosure, the canvas may used to dynamically set the dimensions of the canvas in real time by setting the canvas height and/or width properties using JavaScript. In this manner, canvas ratio frame 190 may be used to set the width and height of the canvas according to display 55 that the user may use for playback of video recording 5. Once the dimensions are set, video player application 60 may stretch the parent mask div (e.g., mask div 185) so as to force the aspect ratio of the masking element to match the aspect ratio of the specific video element to be displayed on display 55. Canvas ratio frame 190 is not visible to the user and may be used for fixing the aspect ratio of the parent masking element.

Video element 195 is a native html media element (e.g., video frame container) that may be used to load and play video recording 5. The size and position of video element 195 may be manipulated inside the mask container, so as to "crop" or zoom into various areas in the video, e.g., the selected video element.

CSS style sheet may apply HT ML styles set forth in each of the four HTML elements in accordance with the HTML structures shown in FIG. 7. The following are parameters related to the HTML structures which are applied by the CSS style sheet to the HTML elements:

Container Div
  container div 182 may be sized according to any suitable dimensions.
  text-align: center centers the masking element horizontally, in the case where the masking element may be bounded by the height of the container.
Mask Div
  top: 50%; transform: translateY(−50%) centers the masking element vertically in case it is bounded by the width of the container.
  The mask div height may be set to 100% to encompass the full height of the parent container.
  position: relative allows to position the children elements (i.e. canvas and video) in relation to it.
  display: inline-block forces the mask container to stretch to the aspect ratio of the canvas child element.
  overflow: hidden creates the masking effect by making the overflowing video invisible outside of the element.
  line-height: 0 allows for pixel perfect positioning of the child video element, since the browser treats it as a text element because of the display: inline-block style.
Canvas
  height: 100%; width: auto stretches the canvas vertically to take the full height of the container while maintaining its set aspect ratio.
  visibility: hidden makes the canvas element invisible to the user.
Video
  height: 100% stretches the video to encompass the full height of the container.
  position: absolute position the video image relative to the masking container while allowing it to overflow outside of the masking container (unlike the canvas element)
  top: 0; left: 0 positions the video in the top left corner of the masking container.
  Transform-origin: top left sets the top left corner as the axis origin for the coordinate system used later on to transform and translate the video in order to zoom into its different parts.

Figure 8:
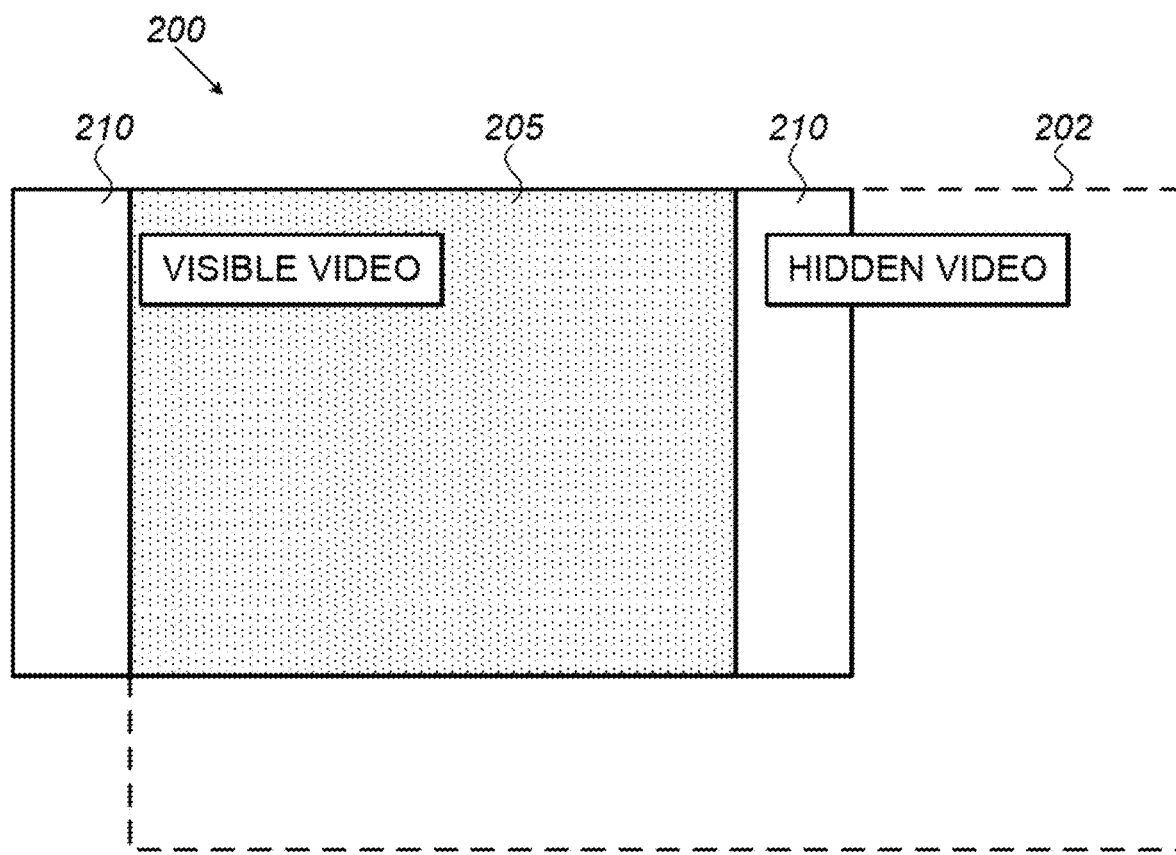
FIG. 8 schematically illustrates a graphic user interface (GUI) with a visible viewing region of a video element, in accordance with some embodiments of the present invention.

FIG. 8 schematically illustrates a graphic user interface (GUI) 200 with visible viewing region 205 of a video element, in accordance with some embodiments of the present invention. GUI 200 as shown in FIG. 8 as an example of video player application 60 having applied the CSS style sheets to the four HTML elements as previously defined. The selected video element during playback may be visible in a region 205 corresponding to the mask container. A dotted line region 202 defines the portion of the selected video element outside of region 205, which is not visible to the user on display 55 during playback. A region 210 may define the margins between container 182 and container 185 that is not occupied by a portion of the selected video element since the size of the mask container is bounded in this example by the height of region 210. Hence, after the user selects a video element for viewing during playback, video player application 60 may precisely define the view of the selected video element for the user to see on display 55. In this example, both the hidden and visible regions of the selected video element are bounded by the top left corner of region 205 and the bottom right of dotted line region 202.

Figure 9:
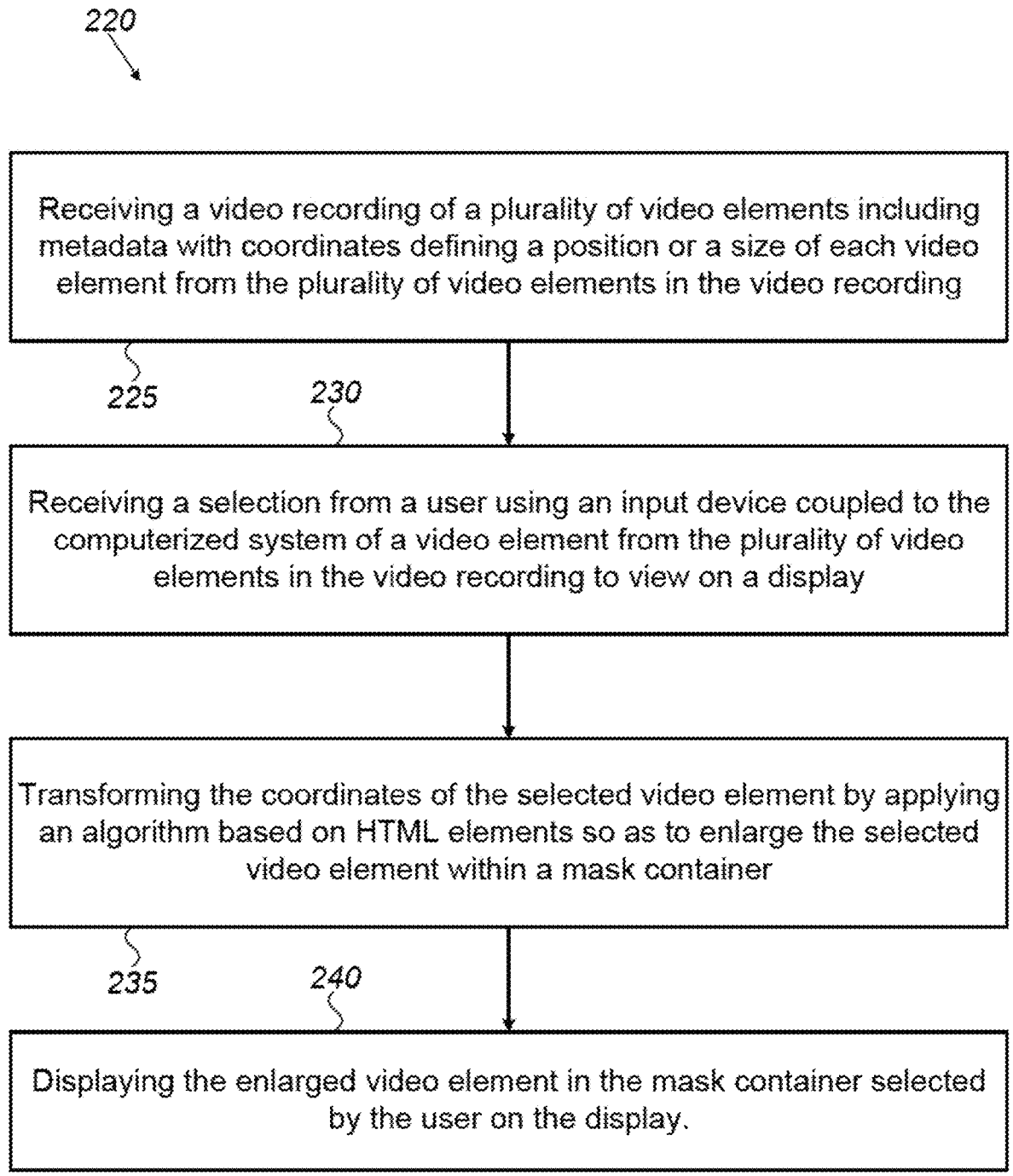
FIG. 9 is a flowchart depicting a method for enlarging a video element during playback of a video recording in a video player application, in accordance with some embodiments of the present invention.

FIG. 9 is a flowchart depicting a method 220 for enlarging a video element during playback of video recording 5 in video player application 60, in accordance with some embodiments of the present invention. Method 220 may be executed by processor 70 of computerized system 50 with display 55.

Method 220 may include receiving 225 video recording 5 of a plurality of video elements including metadata with coordinates defining a position or a size of each video element from the plurality of video elements in video recording 5 in video player application 70.

Method 220 may include receiving 230 a selection from a user using input device 65 coupled to computerized system 50 of a video element from the plurality of video elements in video recording 5 to view on display 55.

Method 220 may include transforming 235 the coordinates of the selected video element by applying an algorithm based on HTML elements so as to enlarge the selected video element within a mask container.

Method 220 may include displaying 240 the enlarged video element in the mask container selected by the user on display 55.

In some embodiments of the present invention, the Javascript code may be used to implement an algorithm used to transform the originally acquired coordinates of the video element in the metadata of video recording 5 so as to allow the user to zoom into the selected video element of the video recording. This may be done by setting the aspect ratio of the canvas to the aspect ratio of the selected video element and by manipulating the video by applying a transformation style.

The basis of the transformation of the video element is the ability to transform HTML elements using the transform style property. The transform property allows for a full 2D linear transformation by applying properties such as translate, scale, rotate, and skew to a 2D element. In order to zoom into specific areas of the video recording as selected by the user (e.g., the selected video element), video player application 60 may manipulate two of these properties: translate and scale.

In some embodiments of the present invention, the algorithm used in video player application 60 may be applied once to the monitors data array(s), an example of which is shown in FIG. 6.

In some embodiments of the present invention, the algorithm may be applied to more than one array when the number of monitors in the video recording changes. For example, suppose at the beginning of video recording 5, an agent's workstation with three monitors was recorded, and after 02:00 minutes, the agent adds or switches on an additional monitor such that the recording of the agent's workstation switches to four monitors. In this case, two arrays may be relayed to computerized system 50 in the metadata, and computerized system 50 may apply the algorithm to both of the arrays. Thus, the algorithm may be dynamically adapted in real time to the case where the number of recorded monitors changes in video recording 5 during playback. The embodiments herein are not limited to handling two arrays in the example described herein above, but may include any number of arrays corresponding to a changing number of monitors in the video recording.

In some embodiments of the present invention, the transformation calculation may account for the combined width and height of the first recorded monitors and their positions, and the current combined width and height of the recorded monitors if the number if the number of monitors changes during video recording 5. The transformation calculation may also fix any scaling issues that may occur when the number of recorded monitors changes during video recording 5.

Four transformation constants may be calculated for each monitor based on combined dimensions of the first-recorded screens, the combined dimensions of the current screens whose values may be different than the previously presented, first-recorded screen only if the number of recorded screens change over time, and the dimensions of the specific screen (e.g., video element) in the array. The four calculated transformation constants are scaleX, scaleY, translateX, and translateY for each monitor may be computed from:

var scaleRatio=initialCombinedHeight/display.height;
var scaleX=scaleRatio*currentCombinedWidth/initialCombinedWidth;
var scaleY=currentCombinedHeight/display.height;
display.scaleX=scaleX;
display.scaleY=scaleY;
display.translateX=(-1)*display.topLefLX*100/currentCombinedWidth+'%';
display.translateY=(-1)*display.topLeftY*100/currentCombinedHeight+'%';

In some embodiments of the present invention, when a user may choose to view a specific monitor (e.g., a specific video element), the styles may be applied to the HTML elements: the canvas may be set to the dimensions of the desired video element, and the calculated constants may be applied to the video element:
canvas.width=display.width;
canvas.height=display.height;
var style='transform: scale('+display.scaleX+','+display.scaleY+')'+'translate('+display.translateX+','+display.translateY+')';
video.setAttribute('style', style);

Another issue treated by the JavaScript code algorithm is to enable responsiveness, or the capability to resize the video element while maintaining the same result when a user changes the window size. For example, if the video height may be bounded by the mask container width, the algorithm sets the height to 100% and the width to auto, so as to maintain aspect ratio. Similarly, if the width may bounded by the mask container width, the algorithm sets the width to 100% and the height to auto.

Figure 10:
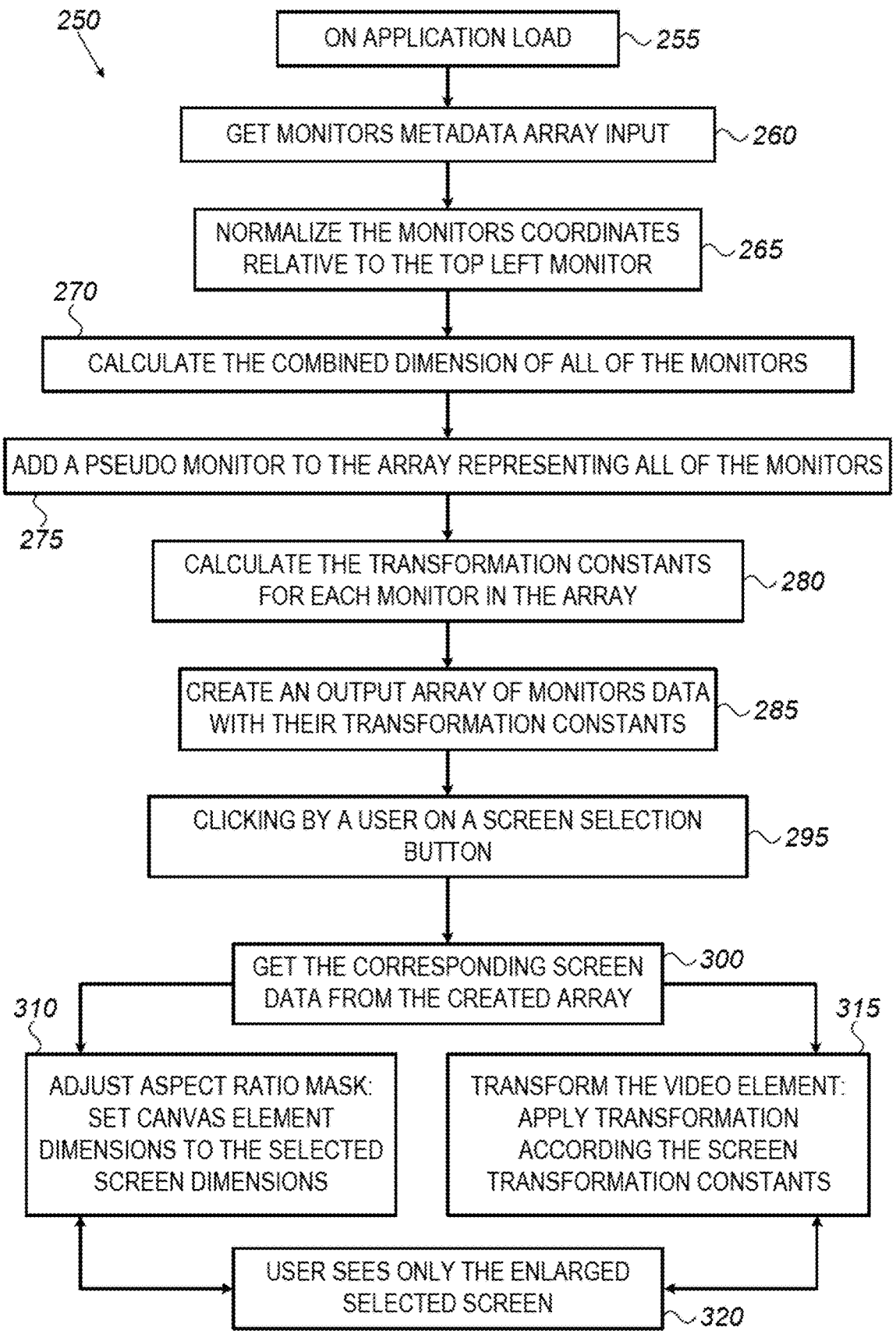
FIG. 10 is an algorithm flowchart depicting a method for enlarging a video element during playback of a video recording in a video player application, in accordance with some embodiments of the present invention.

FIG. 10 is an algorithm flowchart depicting a method 250 for enlarging a video element during playback of video recording 5 in video player application 60, in accordance with some embodiments of the present invention. On loading video player application 60 to computerized system 50 in a step 255, processor 70 may get the monitor metadata array input in a step 260, such as video element coordinates, size and/or resolution (an example shown in FIG. 6). In a step 265, processor 70 may normalize the monitor's coordinates relative to the top left corner of each monitor as shown in FIG. 6.

In a step 270, processor 70 may calculate a combined dimension of all the monitors (e.g., video elements) in video recording 5. In a step 275, processor 70 may add a pseudo monitor to the array representing all of the monitors. The pseudo monitor, for example, may be viewed on display 55 by the user clicking VIEW ALL icon 30 in menu 35. In a step 280, processor 70 may calculate the transformation constants for each monitor (e.g., video element) in the array. In a step 285, processor 70 may create an output array of monitor data with their transformation constants.

In a step 295, processor 70 may receive a screen selection as to which screen to enlarge in video recording 5 upon the user clicking on a screen selection button in menu 35 (e.g., icons 10A, 15A, and 20A, for example, in FIGS. 2 and 3).

In a step 300, processor 70 may get the corresponding screen data from the created output array, which was created in step 285. In two parallel processes, processor 70 may transform the video element in a step 315 and processor 70 may adjust the aspect ratio mask (e.g., of the mask container) in a step 310.

In step 310, processor 70 may adjust the aspect ratio of the mask container by setting the dimensions of the canvas element to the selected screen dimensions (e.g., dimension of the selected video element in video recording 5).

In step 315, processor 70 may transform the video element by applying the transformation according to the transformation constants (calculated in step 280). The transformation according to the transformation constants are based on the coordinates in the metadata.

In a step 320, processor 70 may output the enlarged selected screen on display 55 such that the user only see the enlarged selected screen.

Stated differently, the raw array may be received in step 260 with the video recording with metadata including topLeftX, topLeftY, width and height. In order to transform the selected video element in playback, processor 70 may calculate transformation constants scaleX scaleY transformX, and transformY in step 280 for each array element and use this output array with the transformation constants to manage the video manipulation in runtime (e.g., in steps 300, 310, 315 and 320).

Figure 11:
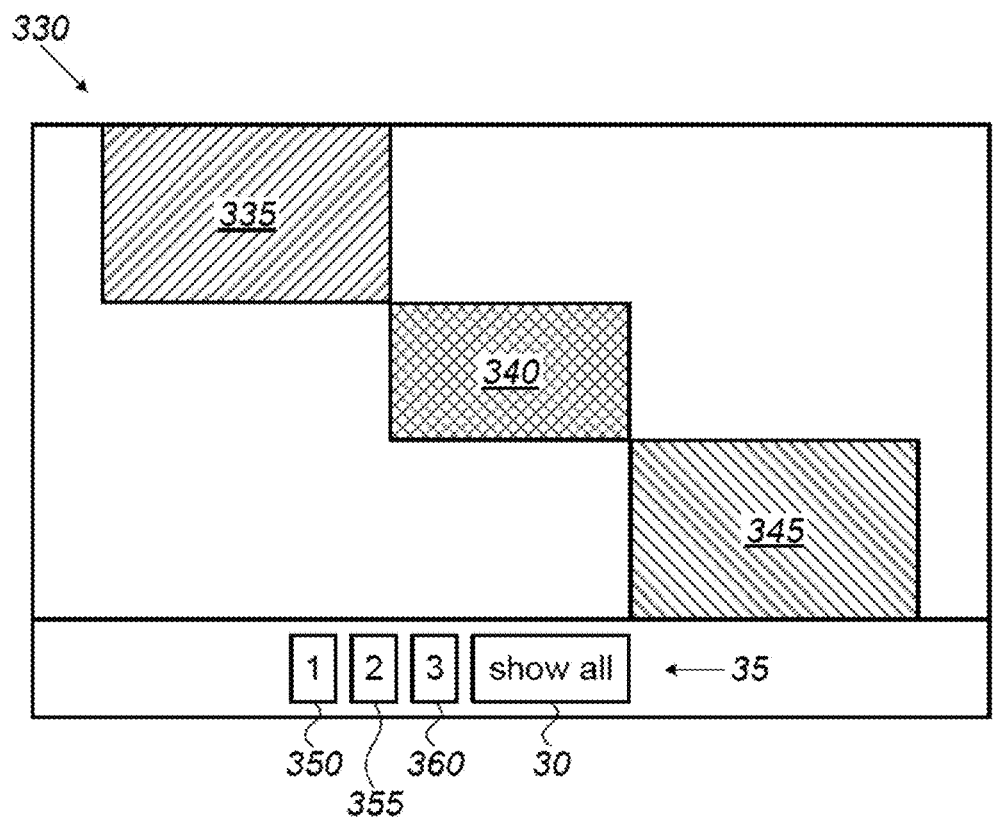
FIG. 11 schematically illustrates a first graphic user interface (GUI) of a video player application, in accordance with some embodiments of the present invention.

FIG. 11 schematically illustrates a first graphic user interface (GUI) 330 of video player application 60, in accordance with some embodiments of the present invention. GUI 330 may include three video elements denoted a first video element 335, a second element 340, and a third video element 345 corresponding to three recorded monitors positioned diagonally in video recording 5. GUI 330 may include a menu 35 with a first video element icon 350 denoted with "1", a second video element icon 355 denoted with "2", and a third video element icon 360 denoted with "3", corresponding to first video element 335, second video element 340, and third video element 345 respectively in video recording 5. Menu 35 may also include VIEW ALL icon 30.

Figure 12:
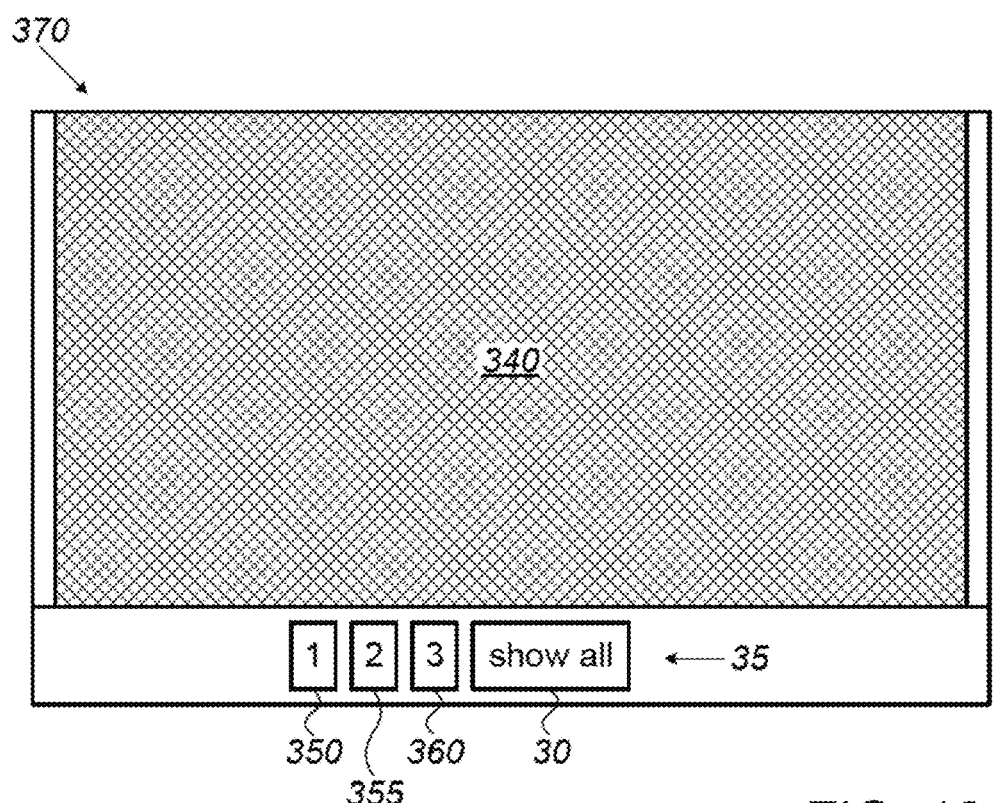
FIG. 12 schematically illustrates a second graphic user interface (GUI) of a video player application after user selected a video element for enlargement, in accordance with some embodiments of the present invention.

FIG. 12 schematically illustrates a second graphic user interface (GUI) 370 of video player application 60 after user selected video element 340 for enlargement, in accordance with some embodiments of the present invention. GUI 370 illustrates an enlarged view of second video element 340 after the user clicked on second video element icon 355.

In some embodiments of the present invention, the source code for implementing the example graphic user interfaces as shown in FIGS. 11 and 12 may be given by:

```
Index.html
<!DOCTYPE html>
<html lang="en">
<head>
    <meta charset="UTF-8">
    <meta http-equiv="X-UA-Compatible" content="IE=edge"/>
    <title>Display Selection Demo</title>
    <link rel="stylesheet" type="text/css" href="playerStyle.css"/>
    <script src="app.js"></script>
</head>
<body>
<div class="app">
    <div class="container" id="videoContainer">
        <div class="mask" id="mask">
            <canvas class="ratioFrame" id="canvas"></canvas>
            <!--this img is a mock of a video tag with the same styles for demo purposes-->
            <img class="video"
                id="video"
                src="data:image/svg+xml;base64,PHN2ZwogICB4bWxucz0iaHR0cDovL3d3dy53My5vcmcvMjA
wMC9zdmciCiAgIGlkPSJzdmc4IgogICB2ZXJzaW9uPSIxLjEiCiAgIHZpZXdCb3g9IjAgMCA0NzI2I
DI4NjgiCiAgIGh1aWdodD0iMjg2OCIKICAgd21kGg9IjQ3MjYiPgogIDxnCiAgICAgWQ9ImxheWV
yMSI+CiAgICA8cmVjdAogICAgICAgeT0iMCIKICAgICAgIHg9IjAiCiAgICAgICBoZWlnaHQ9IjI4N
jgiCiAgICAgICB3aWR0aD0iNDcyNiIKICAgICAgIGlkPSJyZWN0ODQyMyIKICAgICAgIHN0eWx1PSJ
maWxsOiMwMDAwMDAiIC8+CiAgICA8cmVjdAogICAgICAgeT0iMCIKICAgICAgIHg9IjAiCiAgI
CBoZWlnaHQ9IjEwNTAiCiAgICAgICB3aWR0aD0iMTY4MCIKICAgICAgIGlkPSJyZWN0ODQxNyIKICA
gICAgIHN0eWx1PSJmaWxsOiNmZjAwMDAiIC8+CiAgICA8cmVjdAogICAgICAgeT0iMTA1MCIKICAgI
CAgIHg9IjE2ODAiCiAgICAgICBoZWlnaHQ9Ijc2OCIKICAgICAgIHdpZHRoPSIxMzY2IgogICAgICA
gaWQ9InJ1Y3Q4NDE5IgogICAgICAgc3R5bGU9ImZpbGw6IzAwZmYwMCIgLz4KICAgIDxyZWN0CiAgI
CAgICB5PSIxODE4IgogICAgICAgeD0iMzA0NiIKICAgICAgIGhlaWdodD0iMTA1MCIKICAgICAgIHd
pZHRoPSIxNjgwIgogICAgICAgaWQ9InJlY3Q4NDIxIgogICAgICAgc3R5bGU9ImZpbGw6Gw6IzAwMDBmZ
iIgLz4KICA8L2c+Cjwvc3ZnPgo="/>
        </div>
    </div>
    <div class="buttonsContainer">
        <button class="button" onclink="screenPosition(0)">1</button>
        <button class="button" onclink="screenPosition(1)">2</button>
        <button class="button" onclink="screenPosition(2)">3</button>
        <button class="button" onclink="screenPosition('all')">show all</button>
    </div>
</div>
</body>
</html>
playerStyle.css
body, html {
    height: 100%;
    margin: 0;
}
.app{
    height: 100%;
}
.container{
    backgroud: black;
    text-align: center;
    height: 85vh; /*or any height you want*/
}
.mask{
    height: 100%;
    position: relative;
    display: inline-block;
    overflow: hidden;
    line-height: 0;
    top: 50%;
    transform: translateY(-50%);
```

```
}
.ratioFrame{
    visibility: hidden;
    height: 100%;
    width: auto;
}
.video{
    background-color: black;
    height: 100%;
    position: absolute;
    top: 0;
    left: 0;
    transform-origin: top left;
}
.buttonsContainer{
    height:15vh;
    position: relative;
    background: darkgrey;
    text-align: center;
}
.button{
    position: relative;
    top: 50%;
    transform: translateY(-50%);
}
app.js
var displays = [
    {
        topLeftX: -1680,
        topLeftY: -1050,
        width: 1680,
        height: 1050
    },
    {
        topLeftX: 0,
        topLeftY: 0,
        width: 1366,
        height: 768
    },
    {
        topLeftX: 1366,
        topLeftY: 768,
        width: 1680,
        height: 1050
    }
];
var canvas, video, videoContainer, mask;
function adjustAspectRatio( ) {
    var containerRatio = videoContainer.clientHeight / videoContainer.clientWidth;
    var displayRatio = canvas.height / canvas.width;
    if (displayRatio <containerRatio) {
        mask.setAttribute('style', 'height: auto; width: 100%');
        canvas.setAttribute('style', 'height: auto; width: 100%;');
    }
    else{
        mask.setAttribute('style', '');
        canvas.setAttribute('style', '');
    }
}
function normalizeDisplayCoords(displays) {
    var minX = Math.min.apply(Math, displays.map(function (display) {
        return display.topLeftX;
    }));
    var minY = Math.min.apply(Math, displays.map(function (display) {
        return display.topLeftY;
    }));
    displays.forEach(function (display) {
        display.topLeftX -= minX;
        display.topLeftY -= minY;
    });
}
function calculateVideoDim(displays) {
    normalizeDisplayCoords(displays);
    var maxWidth = Math.max.apply(Math, displays.map(function (display) {
        return display.topLeftX + display.width;
    }));
    var maxHeight = Math.max.apply(Math, dtsplays.map(function (display) {
        return display.topLeftY + display.height;
```

```
        }}};
        return {
            width: maxWidth,
            height: maxHeight
        };
    }
}
function calculateDisplayTransformMatrix(displays, currentVideoDim,
initialVideoDim) {
    var currentVideoWidth = currentVideoDim.width;
    var currentVideoHeight = currentVideoDim.height;
    var initialVideoWidth = initialVideoDim.width;
    var initialVideoHeight = initialVideoDim.height;
    if (displays.length > 1) {
        var combined = {
            "topLeftY": 0,
            "topLeftX": 0,
            "width": currentVideoDim.width,
            "height": currentVideoDim.height,
            "combined": true
        };
        displays.push(combined);
    }
    displays.forEach(function (display) {
        var scaleRatio = initialVideoHeight / display.height;
        var scaleX = scaleRatio * currentVideoWidth / initiaiVideoWidth;
        var scaleY = currentVideoHeight / display,height;
        display.scaleX = scaleX;
        display.scaleY = scaleY;
        display.translateX = (−1) * display.topLeftX * 100 /
currentVideoWidth + '%';
        display.translateY = (−1) * display.topLeftY * 100 /
currentVideoHeight + '%';
    }};
}
function prepareDisplaysForPreview(displays. initialVideoDim) {
    var currentVideoDim = calculateVideoDim(displays);
    calculateDisplayTransformMatrix(displays, currentVideoDim,
initialVideoDim);
}
function screenPosition(screen) {
    var display = screen === 'all' ? displays[displays.length − 1] ;
displays[screen];
    var style =
        'transform: scale(' + display.scaleX + ',' + display.scaleY + ') ' +
        'translate(' + display.translateX + ',' + display.translateY + ')';
    canvas.width = display.width;
    canvas.height = display.height;
    video.setAttribute('style', style);
}
function run( ) {
    canvas = document.getElementById('canvas');
    video = document.getElementById('video');
    videoContainer = document.getElementById('videoContainer');
    mask = document.getElementById('mask');
    prepareDisplaysForPreview(displays, calculateVideoDim(displays));
    screenPosition('all');
    adjustAspectRatio( );
}
window.addEventListener("resize", adjustAspectRatio);
window.addEventListener("load", run);
```

In some embodiments of the present invention, a method for enlarging a video element during playback of a video recording in a video player application. The video player application may be executed by a processor of a computerized system, which may include the processor and a display. A video recording of a plurality of video elements including metadata with coordinates defining a position or a size of each video element from the plurality of video elements in the video recording may be received. A selection may be received by a user using an input device coupled to the computerized system of a video element from the plurality of video elements in the video recording to view on the display. The coordinates of the selected video element maybe transformed by applying an algorithm based on HTML elements, so as to enlarge the selected video element within a mask container. The enlarged video element in the mask container selected by the user may be displayed on the display.

In some embodiments of the present invention, the metadata for each video element from the plurality of video elements may include a resolution of each video element in the video recording.

In some embodiments of the present invention, the method may include displaying for the user on the display a plurality of video element icons corresponding to the plurality of video elements in the video recording.

In some embodiments of the present invention, receiving the selection of the video element may include clicking by the user using the input device on one video element icon from the plurality of video element icons on the display.

In some embodiments of the present invention, displaying the plurality of video element icons may include dynamically changing a number of video element icons on the display from a first number to a second number, in response to detecting that a number of video elements in the video recording changes from the first number to the second number.

In some embodiments of the present invention, the video player application executed by the processor may include components selected from the group consisting of: a data model, an HTML markup, a CSS style sheet, and a Javascript code.

In some embodiments of the present invention, transforming the coordinates of the selected video element may include adjusting an aspect ratio of the mask container to an aspect ratio of the display.

In some embodiments of the present invention, receiving the video recording may include receiving the metadata acquired in response to querying an operating system of the computerized system about the position or the size of each video element during recording of the video recording.

In some embodiments of the present invention, the video player application may include an HTML video player for playback of the video recording.

In some embodiments of the present invention, a computerized system executing a video player application for enlarging a video element during playback of a video recording may include a display and a processor. The processor may be configured to receive a video recording of a plurality of video elements including metadata with coordinates defining a position or a size of each video element from the plurality of video elements in the video recording, to receive a selection from a user using an input device coupled to the computerized system of a video element from the plurality of video elements in the video recording to view on the display, to transform the coordinates of the selected video element by applying an algorithm based on HTML elements so as to enlarge the selected video element within a mask container, and to display the enlarged video element in the mask container selected by the user on the display.

The embodiments shown herein for enlarging a video element during playback of a video recording of multiple screen monitors were presented in the framework of a usage case of an agent's workstation in a customer call center. This is not by way of limitation of the embodiments of the present invention. The methods and systems taught herein for enlarging a video element during playback of a video recording may be applied to any suitable usage case. Furthermore, selecting a video element for enlargement during playback of the video recording is not limited to a user clicking on a video element icon as taught herein, any suitable way for selecting the video element for viewing on display 55 may be used, such as for example, a voice-activated input device for making the video element selection.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for enlarging a screen-capture that is a part of multiple screen-captures concatenated into a matrix and recorded into a video recording during playback thereof in a video player application, the method comprising:
   in a video player application executed by a processor of a computerized system comprising the processor and a display, receiving a video recording of a plurality of screen-captures concatenated into a matrix of multiple different screens and recorded into a video recording including metadata with coordinates defining a position or a size of each screen-capture from the plurality of screen-captures concatenated into a matrix of multiple different screen-captures in the video recording;
   receiving a selection from a user using an input device coupled to the computerized system of a screen-capture from the plurality of screen-captures concatenated into a matrix of multiple different screen-captures in the video recording to view on the display;
   transforming the coordinates of the selected screen-capture by applying an algorithm based on HTML elements so as to enlarge the selected screen-capture within a mask container; and
   displaying the enlarged screen-capture in the mask container selected by the user on the display.

2. The method according to claim 1, wherein the metadata for each screen-capture from the plurality of screen-captures concatenated into a matrix of multiple different screens comprises a resolution of each screen-capture in the video recording.

3. The method according to claim 1, further comprising displaying for the user on the display a plurality of screen-capture icons corresponding to the plurality of screen-capture in the video recording.

4. The method according to claim 3, wherein receiving the selection of the screen-capture comprises clicking by the user using the input device on one screen-capture icon from the plurality of screen-capture icons on the display.

5. The method according to claim 3, wherein displaying the plurality of screen-capture icons comprises dynamically changing a number of screen-capture icons on the display from a first number to a second number, in response to detecting that a number of screen-capture in the video recording changes from the first number to the second number.

6. The method according to claim 1, wherein the video player application executed by the processor comprises components selected from the group consisting of: a data model, an HTML markup, a CSS style sheet, and a Javascript code.

7. The method according to claim 1, wherein transforming the coordinates of the selected screen-capture comprises adjusting an aspect ratio of the mask container to an aspect ratio of the display.

8. The method according to claim 1, wherein receiving the video recording comprises receiving the metadata acquired in response to querying an operating system of the computerized system about the position or the size of each screen-capture during recording of the video recording.

9. The method according to claim 1, wherein the video player application comprises an HTML video player for playback of the video recording.

10. The method according to claim 1, wherein the method further comprises normalizing the screen-capture coordinates relative to top left screen.

11. The method according to claim 1, wherein the method further comprises calculating the combined dimension of all of the monitors.

12. The method according to claim 1, wherein the method further comprises adding a pseudo monitor to the array representing all of the monitors.

13. The method according to claim 1, wherein the method further comprises calculating the transformation constants for each monitor array.

14. The method according to claim 13, wherein the method further comprises creating an output array of monitors data with their calculated transformation constants.

15. The method according to claim 14, wherein the method further comprises getting corresponding screen-capture data from the created output array and adjusting ratio mask or transforming the user selected screen.

16. A computerized system executing a video player application for enlarging a screen-capture that is a part of multiple screen-captures concatenated into a matrix and recorded into a video recording during playback thereof, the computerized system comprising:
a display; and
a processor configured to receive a video recording of a plurality of screen-captures concatenated into a matrix of multiple different screen-captures and recorded into a video recording including metadata with coordinates defining a position or a size of each screen-capture from the plurality of screen-captures concatenated into a matrix of multiple different screen-captures in the video recording, to receive a selection from a user using an input device coupled to the computerized system of a screen-capture from the plurality of screens concatenated into a matrix of multiple different screen-captures in the video recording to view on the display, to transform the coordinates of the selected screen-capture by applying an algorithm based on HTML elements so as to enlarge the selected screen-capture within a mask container, and to display the enlarged screen-capture in the mask container selected by the user on the display.

17. The computerized system according to claim 16, wherein the metadata for each screen-capture from the plurality of screen-captures comprises a resolution of each screen-capture in the video recording.

18. The computerized system according to claim 16, the processor is configured to display for the user on the display a plurality of screen-capture icons corresponding to the plurality of screen-captures in the video recording.

19. The computerized system according to claim 18, wherein the processor is configured to receive the selection of the screen-capture upon the user clicking with the input device on one screen-capture icon from the plurality of screen-capture icons on the display.

20. The computerized system according to claim 18, wherein the processor is configured to display the plurality of screen-capture icons by dynamically changing a number of screen-capture icons on the display from a first number to a second number, in response to detecting that a number of screen-capture in the video recording changes from the first number to the second number.

21. The computerized system according to claim 16, wherein the video player application executed by the processor comprises components selected from the group consisting of: a data model, an HTML markup, a CSS style sheet, and a Javascript code.

22. The computerized system according to claim 16, wherein the processor is configured to transform the coordinates of the selected screen-capture by adjusting an aspect ratio of the mask container to an aspect ratio of the display.

23. The computerized system according to claim 16, the processor is configured to receive the video recording by receiving the metadata acquired in response to querying an operating system of the computerized system about the position or the size of each screen-capture during recording of the video recording.

24. The computerized system according to claim 16, wherein the video player application comprises an HTML video player for playback of the video recording.

25. The computerized system according to claim 16, wherein the processor is further configured to normalize the screen coordinates relative to top left screen.

26. The computerized system according to claim 16, wherein the processor is further configured to calculate the combined dimension of all of the monitors.

27. The computerized system according to claim 16, wherein the processor is further configured to add a pseudo monitor to the array representing all of the monitors.

28. The computerized system according to claim 16, wherein the processor is further configured to calculate the transformation constants for each monitor array.

29. The computerized system according to claim 28, wherein the processor is further configured to create an output array of monitors data with their calculated transformation constants.

30. The computerized system according to claim 29, wherein the processor is further configured to get corresponding screen-capture data from the created output array and to adjust ratio mask or transform the user selected screen.

* * * * *